United States Patent
Mohamad et al.

(10) Patent No.: US 10,680,754 B2
(45) Date of Patent: Jun. 9, 2020

(54) DYNAMIC AND SELECTIVE FD-DSDF TRANSMISSION OF A DIGITAL SIGNAL FOR A MARC/MAMRC SYSTEM WITH FULL-DUPLEX RELAY AND A LIMITED FEEDBACK

(71) Applicant: ORANGE, Paris (FR)

(72) Inventors: Abdulaziz Mohamad, Le Ulis (FR); Raphael Visoz, Vanves (FR); Antoine Berthet, Chatneay Malabry (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/312,573

(22) PCT Filed: Jun. 22, 2017

(86) PCT No.: PCT/FR2017/051660
§ 371 (c)(1),
(2) Date: Dec. 21, 2018

(87) PCT Pub. No.: WO2017/220938
PCT Pub. Date: Dec. 28, 2017

(65) Prior Publication Data
US 2019/0229851 A1 Jul. 25, 2019

(30) Foreign Application Priority Data
Jun. 23, 2016 (FR) ..................... 16 55889

(51) Int. Cl.
*H04L 1/00* (2006.01)
*H04L 1/18* (2006.01)
*H04L 5/14* (2006.01)

(52) U.S. Cl.
CPC .......... *H04L 1/0076* (2013.01); *H04L 1/1819* (2013.01); *H04L 5/14* (2013.01); *H04L 2001/0097* (2013.01)

(58) Field of Classification Search
CPC ..... H04L 1/0041; H04L 1/0048; H04L 1/005; H04L 1/0061; H04L 1/0076; H04L 1/18;
(Continued)

(56) References Cited

U.S. PATENT DOCUMENTS

| | | | |
|---|---|---|---|
| 8,948,232 B2* | 2/2015 | Hatefi | ............... H04L 1/004 375/211 |
| 10,122,496 B2 | 11/2018 | Mohamad et al. | |

(Continued)

FOREIGN PATENT DOCUMENTS

| | | |
|---|---|---|
| WO | 2015197990 A1 | 12/2015 |
| WO | 2015197991 A1 | 12/2015 |

OTHER PUBLICATIONS

Hatefi et al, Full Diversity Distributed Coding for the Multiple Access Half-Duplex Relay Channel, IEEE, 6 pages, 2011.*
(Continued)

*Primary Examiner* — Frank Duong
(74) *Attorney, Agent, or Firm* — David D. Brush; Westman, Champlin & Koehler, P.A.

(57) ABSTRACT

A full-duplex relay and method of a telecommunication system having several sources, at least the relay and a recipient. The relay includes: a decoder estimating a message for each source, from successive received blocks transmitted during a current interval by a source, a decision module deciding which source messages were decoded without error from the estimated messages, a network encoder encoding a selection of the messages decoded without error and a transmitter transmitting a signal representative of the network encoded messages to the destination and a control signal indicating the selected messages. The decision module selects messages decoded without error at the input of the network encoder by only considering a return path from the destination indicating correct or incorrect decoding of messages. After each reception of a block,
(Continued)

Figure 1:
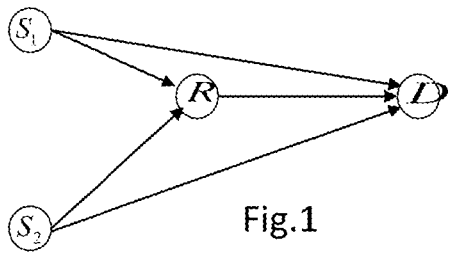

the decision module prevents the emission by the transmitter for a time period necessary to receive and decode the return path.

8 Claims, 3 Drawing Sheets

(58) Field of Classification Search
CPC ... H04L 1/1819; H04L 5/0023; H04L 5/0032; H04L 5/14; H04L 2001/0097; H03M 13/27; H03M 13/2792
See application file for complete search history.

(56) References Cited

U.S. PATENT DOCUMENTS

| | | | |
|---|---|---|---|
| 10,153,864 B2 | 12/2018 | Mohamad et al. | |
| 2006/0291440 A1 | 12/2006 | Hauel et al. | |
| 2015/0067454 A1* | 3/2015 | Benammar | H04L 5/0023 714/807 |
| 2015/0124694 A1* | 5/2015 | Benammar | H04L 1/0076 370/315 |

OTHER PUBLICATIONS

Hatefi et al, Joint Network-Channel Distributed Coding for the Multiple Access Full-Duplex Relay Channel, IEEE, 6 pages, 2010.*
Hatefi et al, Relaying Functions for the Multiple Access Relay Channel, IEEE, 5 pages, 2010.*
Hatefi et al, Near Outage Limit Joint Network Coding and Decoding for the Non-Orthogonal Multiple-Access Relay Channel, IEEE, 7 pages, 2012.*
Lei, Half-Duplex Relaying for the Multi-User Channel: Capacity Bounds, Fading Channel Performance and Asymptotical Behavior, thesis, Concordia University, 118 pages, Nov. 2014.*
Mohamad et al, Code Design for Multiple-Access Multiple-Relay Wireless Channels with Non-Orthogonal Transmission, IEEE, 7 pages, 2015.*
Mohamad et al, Outage Analysis of Various Cooperative Strategies for the Multiple Access Multiple Relay Channel, IEEE, 6 pages, 2013.*
Mohamad et al, Outage Achievable Rate Analysis for the Non Orthogonal Multiple Access Multiple Relay Channel, IEEE, 6 pages, 2013.*
Mohamad et al, Dynamic Selective Decode and Forward in Wireless Relay Networks, IEEE, 7 pages, 2015.*
International Search Report dated Jul. 27, 2017 for corresponding International Application No. PCT/FR2017/051660, filed Jun. 22, 2017.
International Written Opinion dated Jul. 27, 2017 for corresponding International Application No. PCT/FR2017/051660, filed Jun. 22, 2017.
Henri Dubois-Ferriere et al., "Packet Combining in Sensor Networks", Proceedings of the 3rd International Conference on Embedded Networked Sensor Systems, Sensys '05, Jan. 1, 2005 (Jan. 1, 2005), p. 102, XP055121035.
International Preliminary Report on Patentability and English translation of Written Opinion dated Dec. 25, 2018 for corresponding International Application No. PCT/FR2017/051660, filed Jun. 22, 2017.

* cited by examiner

DYNAMIC AND SELECTIVE FD-DSDF TRANSMISSION OF A DIGITAL SIGNAL FOR A MARC/MAMRC SYSTEM WITH FULL-DUPLEX RELAY AND A LIMITED FEEDBACK

CROSS-REFERENCE TO RELATED APPLICATIONS

This application is a Section 371 National Stage Application of International Application No. PCT/FR2017/051660, filed Jun. 22, 2017, which is incorporated by reference in its entirety and published as WO 2017/220938 A1 on Dec. 28, 2017, not in English.

FIELD OF THE INVENTION

In general, the present invention relates to the field of digital communications. More precisely, the field of the invention is that of the transmission of coded data in a MARC (Multiple-Access Relay Channel) or MAMRC (Multiple-Access Multiple Relay Channel) network. A MAMRC network is a telecommunication system which, for a given destination, comprises at least four nodes: at least two senders and two relays. More precisely, the invention pertains to relaying and it relates to the improvement of the quality of data transmission, and in particular the improvement of the performance of the error-correcting decoding in a receiver (destination). The relaying is implemented by a relay which cooperates with the sources to obtain a more reliable communication between the sources and the destination. Two types of relay operation are distinguished: the half-duplex mode and the full-duplex mode.

The invention applies especially, but not exclusively, to the transmission of data via mobile networks for example for real-time applications or via networks of sensors for example for the uploading of measurements. It applies to so-called "Full Duplex" (FD) relays with links between the relays and the destination which are non-orthogonal (with interference). In the patent application the link is the communication channel between two or more nodes and it may be physical or logical. When the link is physical it is then generally called a channel.

PRIOR ART

Networks, in particular mobile networks, are in search of appreciable gains in terms of capacity, reliability, consumption, etc. The transmission channel of a mobile network is deemed to be difficult and leads to relatively mediocre transmission reliability. Significant advances have been made in recent years, in relation to coding and modulation, especially with regard to considerations in respect of consumption and capacity. Indeed, in a mobile network where several transmitters/receivers share the same resources (time, frequency and space), the transmission power must be reduced to the maximum possible extent.

This reduction runs counter to the coverage and therefore to the capacity of the system and more generally to its performance.

To increase coverage, enhance the reliability of communications and more generally improve performance, one approach consists in relying on relays to increase the spectral efficiency (coding gain) and therefore to improve the transmission efficiency and the reliability of the systems (diversity gain). The basic topology, illustrated by FIG. 1, of MARC systems is such that the sources, nodes $S_1$ and $S_2$, broadcast their coded information sequences for the attention of the relay R and of the recipient D. The relay decodes the received signals arising from the sources $S_1$ and $S_2$ and re-encodes the former jointly while adding inherent redundancy creating a spatially distributed network code as seen from the receiver D. At the destination D, the decoding of the three spatially distributed coded sequences, comprising the two received coded sequences arising directly from the sources S1 and S2 and the coded sequence arising from the relay, rests on an algorithm for joint decoding of a channel coding and of a network coding termed joint channel and network decoding.

Network coding is a form of cooperation according to which the nodes of the network share not only their inherent resources (power, band, etc.) but also their calculation capacity, so as to create a distributed coding which becomes more and more powerful as the information propagates through the nodes. It brings substantial gains in terms of diversity and coding and therefore of reliability of transmission.

According to the full-duplex mode, the relay receives the new information blocks from the two sources and simultaneously transmits to the recipient an item of information based on the previously received blocks; the relay can therefore receive and send simultaneously on one and the same frequency band or on different bands. In comparison to the half-duplex relay, the full-duplex relay makes it possible to achieve greater capacity.

Patent application WO 2015197990 pertains to a MARC system according to which the sources send T messages in consecutive time intervals t. Each message is coded and each code word is composed of B blocks transmitted in successive time sub-intervals. The accumulation of the blocks from 1 to b is a code word of a code whose rate decreases with b, $1 \le b \le B$. The system implements a relaying protocol which transmits only words decoded without error according to a technique termed D-SDF (Dynamic Selective Decode and Forward). Error detection at the relay is based on verification of the CRC (the abbreviation standing for Cyclic Redundancy Check) included in the source messages. The dynamic character stems from a selection scheme which drives the choice of the words decoded without error which participate in the network coding before sending by the relay. Moreover, each relay includes in its transmission a control signal indicating to the destination and to the other relays, the sources' messages with which it cooperates.

This protocol makes it possible to contribute to an increase in the probability of correctly decoding the messages received by the recipient by having a selection scheme which uses at a current transmission interval messages decoded without error during a previous interval.

Main Characteristics of the Invention

The invention pertains to the transmission of a digital signal in a network with at least four nodes comprising two senders, at least one relay and a recipient making it possible to improve the energy efficiency and spectral efficiency of the transmission when the relay is full duplex, which can therefore receive and transmit simultaneously, while limiting the complexity of decoding at the relay and at the destination.

The subject of the invention is a method for relaying messages implemented by a telecommunication system comprising M sources, L relays full-duplex relays and a destination, M>1, L≥1, the method comprising per relay and for a current transmission cycle of T transmission intervals, T a natural number, T>1:

decoding so as to estimate a message per source on the basis of successive received blocks sent during a current interval t of transmission by a source S corresponding to a code word $c_{S,t}$ comprising B blocks $c_{S,t}^{(1)}$, $c_{S,t}^{(2)}$, ... $c_{S,t}^{(b)}$, ..., $c_{S,t}^{(B)}$ the first of which can be decoded independently of the other blocks, a code word $c_{S,t}$ coding a message $u_{S,t}$ of K bits, the sources sending simultaneously, with K and B natural numbers, B>2, 1≤t≤T, error detection on the estimated messages and decision of the source messages $u_{S,t}$ decoded without error, at each estimation of a message subsequent to a block received from a source, network coding of a selection of the messages decoded without error, transmission to the destination of a signal representative of the network-coded messages and of a control signal indicating the selected messages ($\mathcal{S}_{R,t,b-1} \backslash \mathcal{S}_{D,t,b-1}$), after each reception of a block from the various sources S, the relay does not transmit during a time period required for receiving and decoding a feedback originating from the destination indicating correct or incorrect decoding of one or more messages, the relay selects the messages to be coded from among the messages decoded without error by the relay by taking only the feedback into account.

The subject of the invention is furthermore a full-duplex relay intended for a telecommunication system comprising M sources, L relays and a destination, M>1, L≥1, for a current transmission cycle of T transmission intervals, T a natural number, T>1, comprising:

a decoder for estimating a message per source, on the basis of successive received blocks sent during a current interval t of transmission by a source S corresponding to a code word $c_{S,t}$ comprising B blocks $c_{S,t}^{(1)}$, $c_{S,t}^{(2)}$, ... $c_{S,t}^{(b)}$, ..., $c_{S,t}^{(B)}$ the first of which can be decoded independently of the other blocks, a code word $c_{S,t}$ coding a message $u_{S,t}$ of K bits, the sources sending simultaneously, with K and B natural numbers, B>2, 1≤t≤T, a decision module for deciding source messages $u_{S,t}$ decoded without error on the basis of the estimated messages, at each estimation of a message subsequent to a received block, a network coder of a selection of the messages decoded without error and a sender of a signal representative of the network-coded messages to the destination and of a control signal indicating the selected messages ($S_{R,t-1}$, $S_{R,t-1} \cap \overline{S}_{D,t-1}$).

The relay is such that the decision module selects the messages decoded without error as input of the network coder by taking into account only a feedback originating from the destination indicating correct or incorrect decoding of one or more messages of the sources and such that the decision module prohibits after each reception by the relay of a block the sending by the sender during a time period required for receiving and decoding the feedback.

The subject of the invention is furthermore a source of a digital signal intended for a telecommunication system comprising M sources, L relays and a destination, M>1, L≥1, comprising:

a coder of messages $u_{S,t}$ of K bits comprising a CRC into code words $c_{S,t}$ of type with finite incremental redundancy so as to deliver at each transmission sub-interval b=1, 2, ..., B of a current transmission cycle of T transmission intervals, T a natural number, T>1, a block $c_{S,t}^{(b)}$ such that the B successive blocks $\{c_{S,t}^{(b)}: 1 \leq b \leq B\}$ form the code word $c_{S,t}$ such that the first block can be decoded independently of the other blocks and such that the following blocks are parity bits which add redundancy to the first block, with K and B natural numbers, B>2, 1≤t≤T, a sender of the blocks of a code word $c_{s,t}$ during the current transmission interval t destined for the relays and for the destination, a controller of the sender, a receiver of a feedback originating from the destination indicating correct or incorrect decoding of the messages of the sources such that the sender halts the sending of the blocks of the code word $c_{s,t}$ when the feedback indicates correct decoding of the message $u_{S,t}$ of the source S.

The source is such that after each sending by the sender of a block, the controller prohibits any sending by the sender during a time period required for receiving and decoding the feedback.

Thus, the relay forms part of a MARC (Multiple-Access Relay Channel) or MAMRC (Multiple-Access Multiple Relays Channel) system which comprises at least two sources, the relay and the destination. The system can comprise more than two sources and several relays.

The sources simultaneously send destined for one and the same destination thereby making it possible to use the common spectral resource to the maximum possible extent. The sources send T messages in consecutive transmission intervals t which may, however, be of variable duration.

The relaying method is such that the coding at the sources is of type with finite incremental redundancy and delivers at each transmission sub-interval b=1, 2, ..., B of a current transmission interval t a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks and such that the following blocks are parity bits which add redundancy to the first block.

The relay estimates the received messages originating from the sources and code only certain of the messages detected without error in the form of a representative signal.

The relay being full-duplex, it can simultaneously listen to a feedback originating from the destination and transmit. If the destination correctly decodes the message of a source, it uploads via a feedback an indication that the message of the source i is or is not correctly decoded. To ensure the causality of the method, the feedback is multiplexed in time with the transmissions of the sources and of the relay. On the basis of the return from the destination, the relay can deduce the collection of the messages correctly decoded by the destination and adapt its selection for the following sub-interval on the basis of the messages that it has decoded without error. At the following sub-interval, the relay discards the message of the source i (if it has decoded it correctly) from its selection of the messages that it has decoded without error, doing so before network coding the messages of its selection.

Thus, a relay sends information only on the messages which are not yet decoded correctly by the destination thus optimizing the use of the transmission channel. The relay collaborates only with the messages remaining to be decoded by the destination thereby simplifying the processing on reception by the destination and thereby making it possible to reduce at least the consumed power required for the network coding and for the network decoding as well as the interference generated within the system and therefore the power required to combat such interference.

The relay can furthermore utilize the return signals so as to act upstream during the detection and decoding of the messages received from the sources and discard those of the sources already decoded without error by the destination.

According to one embodiment, the feedback consists of nominative control signals per source.

According to this mode, the indication is made via control signals of acknowledgment type $ACK_i$ (Acknowledge). The control channel for the transmission of the signals $ACK_i$ is then multiplexed in time with the transmissions of the sources and of the relay. The destination thus uploads a control signal $ACK_i$ at the end of each sub-interval b after reception and decoding of the blocks received from the sources with the aid of the signals received from the relays. The simplest is that each control signal comprises an identifier of the source i, therefore is nominative of a source, and comprises a bit set to zero or to one depending on whether the message of this source is or is not decoded without error by the destination.

According to one embodiment, the method comprises per source S:
coding into a code word $c_{s,t}$ of a message $u_{s,t}$ of K bits comprising a CRC, the coding being of type with finite incremental redundancy and delivering a block $c_{S,t}^{(b)}$ at each transmission sub-interval b of the current transmission interval t, $1 \leq b \leq B$, such that the B successive blocks $c_{S,t}^{(1)}, c_{S,t}^{(2)}, \ldots c_{S,t}^{(b)}, \ldots, c_{S,t}^{(B)}$ form the code word $c_{S,t}$, such that the first block can be decoded independently of the other blocks and such that the following blocks are parity bits which add redundancy to the first block,
sending after modulation of the blocks $c_{S,t}^{(b)}$ during the B transmission sub-intervals destined for the relay and for the destination.

According to this embodiment, the detection by the relay of messages decoded without errors can be performed by means of a code of CRC type included in the messages $u_{S,t}$ of K bits sent by the sources.

According to one embodiment, after each sending of a block, a source S does not transmit during a time period required for receiving and decoding the feedback originating from the destination indicating correct or incorrect decoding of one or more messages of the sources and in which the source halts the sending of the blocks if its message $u_{S,t}$ is indicated correctly decoded.

Thus, each source takes account of the feedback to halt its sending of the blocks of a message if this feedback comprises the identification of the message of this source. The source therefore stops transmitting the message and thus optimizes its occupancy of the channel during transmission. To ensure the causality of the relaying method, each of the sources is silent after each sending of a block and for a time sufficient to receive a return from the destination and to decode it.

According to one embodiment, the source passes to the transmission interval following the current transmission interval t of the current transmission cycle or passes to a cycle following the current transmission cycle if the current interval t is equal to T or if all the messages have been correctly decoded by the destination.

According to this mode, the source passes to the transmission interval following the current transmission interval of the current cycle i.e. the source empties its memories of input data to be transmitted and takes new input data into account.

However if the current interval t is equal to T or if all the messages have been correctly decoded by the destination then the source can pass to a cycle following the current transmission cycle.

Each relay which notes that all the messages of a transmission cycle have been decoded without error by the destination or which notes that the sub-interval of transmission of the last block of the last message has been reached can empty its memories and prepare to receive the messages of the following transmission cycle.

The coding at the relays which comprises a network coding makes it possible for all of the dispersed sources to benefit from the coding gain of a spatially distributed network code without decreasing the spectral efficiency. This makes it possible to implement in the receiver of the recipient an iterative decoding which relies on the redundancies generated in the relays without making it necessary to increase the power in the senders of the sources in order to achieve an increase in the coverage of the system and the spectral efficiency.

The transmission protocol avoids the propagation of transmission error introduced more particularly when the source-to-relay links are not very reliable by not transmitting the messages detected with error. The interleaving of the messages detected without error is a known technique required for carrying out jointly the channel decoding of the signals of the sources and of the signal of the relay at the destination when they use the same radio resources.

The transmission protocol contributes to a reduction in the energy consumption by combating error propagation and by effectively combating interference (when it cooperates the relay still transmits an item of information which is useful to the destination).

The protocol makes it possible to achieve maximum efficiency by limiting the messages participating in the network coding of a relay to those which have not yet been correctly decoded by the destination. The coding capacity of the relay is thus tailored to what is strictly necessary at each sub-interval as a function of the return from the destination and the link between the relay and the destination is not congested by information already known to the destination.

The simultaneous sending by the sources can occur on one and the same radio resource (code or frequency) thereby making it possible to use the common spectral resource to the maximum possible extent; the source relay links are in this case non-orthogonal. There is therefore interference between the signals received by the relays and between the signals received by the destination on account of the superposition of the source signals during transmission on the one hand between the sources and the relay and on the other hand between the sources and the destination (the receiver).

According to one embodiment, the sources send simultaneously on one and the same radio resource, the step of decoding at the relay is iterative and comprises a joint detection and a joint decoding. The joint detection and the joint decoding in the relay make it possible to separate the streams sent simultaneously by the two senders.

In the case where the sources send simultaneously but on different spectral resources, the step of iterative joint detection and decoding of the sources is not necessary at the relay. In this case, the relay can decode each message of the sources on the basis of sequences received without interference between the sources. The source relay links on the one hand and source destination links on the other hand are in this case orthogonal in terms of frequency or code.

According to one mode of implementation the system comprises several relays, one then speaks of a MAMRC system.

A MAMRC system can be such that the relays do not listen to one another.

According to a particularly simple implementation, the relays do not interfere with one another by transmitting on different radio resources. This implementation occurs more particularly when access to the channel is of FDMA type; the sources access the channel on a common frequency band and each relay accesses the channel on a frequency band specific to each relay. Optionally one of the relays uses the same band as the sources. This implementation implies that to recover a diversity of order L+1 with L relays and M sources, the relays implement a network coding in a Galois field whose cardinality is greater than two when L>1. Non-optimal use of the radio resource leads to a simple protocol, to a slight modification of the relay with respect to a full-duplex relay suitable for a MARC system (with a single relay) and to an increase in the useful information that can be utilized by the destination at the price however of a network decoding at the destination which is slightly more complex than in that of a MARC system.

The spectral resources used by the relays may be different from those used by the sources. The more considerable the number of different spectral resources used relative to the number of sources and of relays, the simpler the detection at the destination: the destination must resolve fewer collisions. On the other hand, increasing the number of different spectral resources used decreases the spectral efficiency of the system. The description of exemplary embodiments concentrates on dealing with the case where the spectral efficiency is maximized, the other cases being deduced by simplification of the receivers either at the relay or at the destination (or both).

A relay which listens to one or more relays in addition to the sources receives the signals as does the destination in a MARC system. That is to say that it detects and decodes simultaneously the messages of the sources and the information, transmitted by the other relays, representative of sources' messages decoded without error by these other relays. This implementation leads to optimal use of the radio resource and of the network coding at the price, however, of an increase in the complexity of the relays and of the destination. At the same instant a single or several relays may be active.

The relays can equally well be fixed relays or mobile relays. Having regard to the density of communications to be transmitted in heavily populated zones, the number of relays may be considerable and much greater than two. Indeed, to cover such zones, fixed relays may be used preferably at base stations whose cost may be markedly greater. Alternatively, mobile relays may be used. These mobile relays are typically mobile terminals.

According to one embodiment, the relaying method comprises an interleaving per source for which a message is decoded without error before a network coding.

The interleaving on input to the network coding makes it possible to have at the destination a structure similar to a parallel concatenation (similar to a distributed turbo-code). As a function of the type of network decoding at the destination the interleavings may or may not be distinct amongst the sources.

According to one embodiment, the network coding is followed by a first interleaving, by a channel coding and by a second interleaving distinct from the first.

The second interleaving makes it possible to allot a certain signature to the signal transmitted by the relay which makes it possible to distinguish it at the destination from the signals transmitted simultaneously by the sources or by another relay.

After separation at the destination of the signal transmitted by the relay, the first interleaving, optionally variable as a function of the block, allows separation (in the sense of statistical independence) between the network coding and the channel coding.

According to a preferred implementation, the steps of the relaying method are determined by the instructions of a relaying program incorporated into one or more electronic circuits such as chips itself being able to be disposed in electronic devices of the MARC or MAMRC system. The relaying method according to the invention can equally well be implemented when this program is loaded into a calculation facility such as a processor or equivalent, operation of which is then controlled by the execution of the program.

Consequently, the invention applies also to a computer program, especially a computer program on or in an information medium, suitable for implementing the invention. This program can use any programming language, and be in the form of source code, object code, or of code intermediate between source code and object code such as in a partially compiled form, or in any other desirable form for implementing a method according to the invention.

The information medium can be any entity or device capable of storing the program. For example, the medium can comprise a storage means, such as a ROM, for example a CD ROM or a microelectronic circuit ROM, or else a magnetic recording means, for example a USB key or a hard disk.

Alternatively, the information medium can be an integrated circuit into which the program is incorporated, the circuit being adapted to execute or to be used in the execution of the method in question.

Moreover, the program can be translated into a transmissible form such as an electrical or optical signal, which can be conveyed via an electrical or optical cable, by radio or by other means. The program according to the invention can in particular be downloaded over a network of Internet type.

The subject of the invention is therefore furthermore a computer program on an information medium comprising program instructions suitable for the implementation of a method for relaying a digital signal according to the invention, when said program is loaded and executed in a relay intended for a MARC or MAMRC system intended to implement the relaying method.

And the subject of the invention is furthermore an information medium comprising program instructions suitable for the implementation of a method for relaying a digital signal according to the invention, when said program is loaded and executed in a relay intended for a MARC or MAMRC system intended to implement the relaying method.

LIST OF FIGURES

Figure 2:
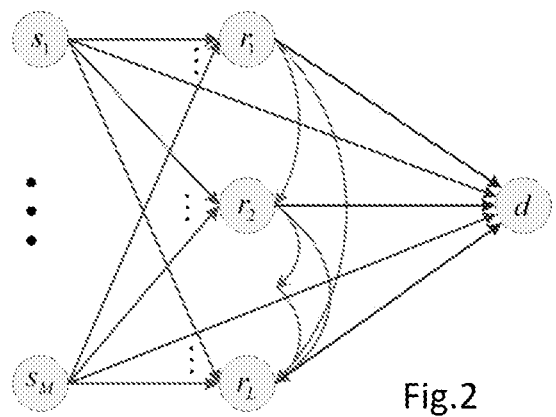
Figure 3:
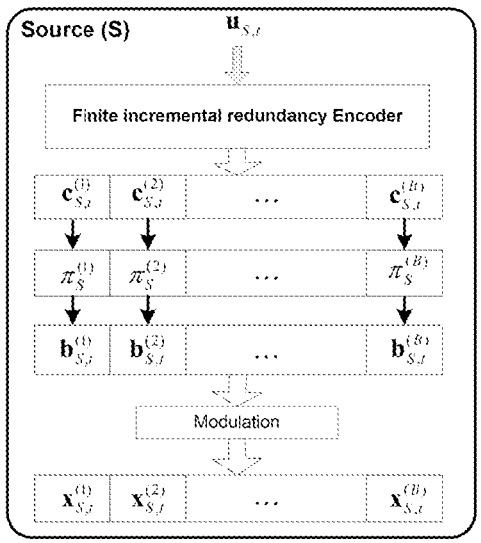
Figure 4:
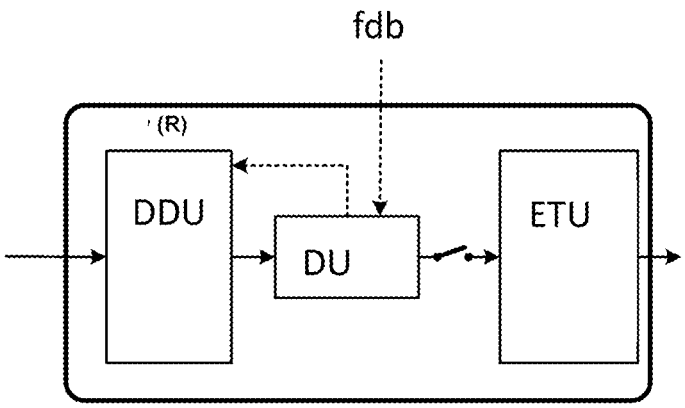
Figure 5:
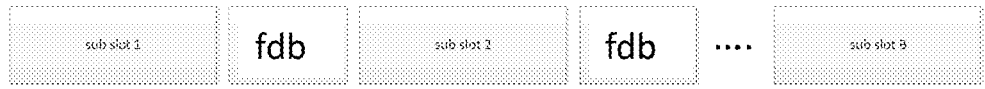
Figure 6:
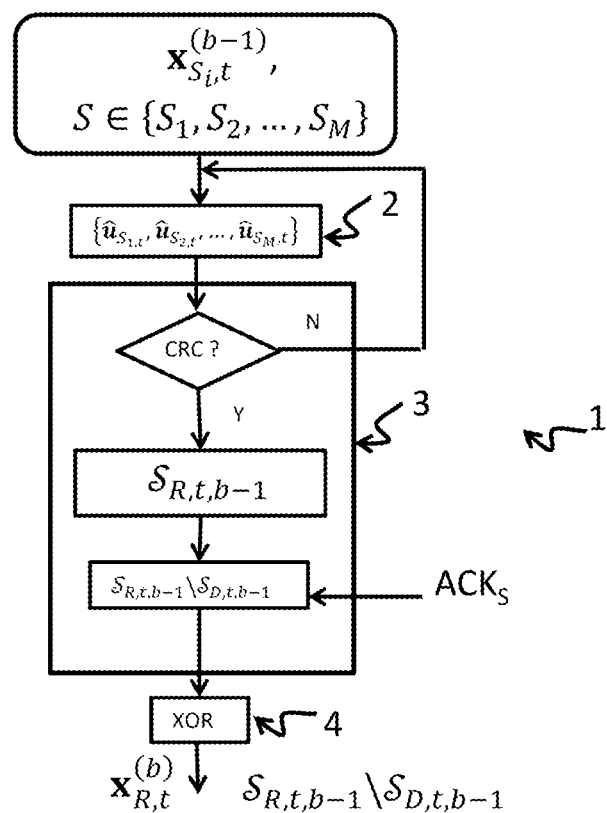
Figure 7:
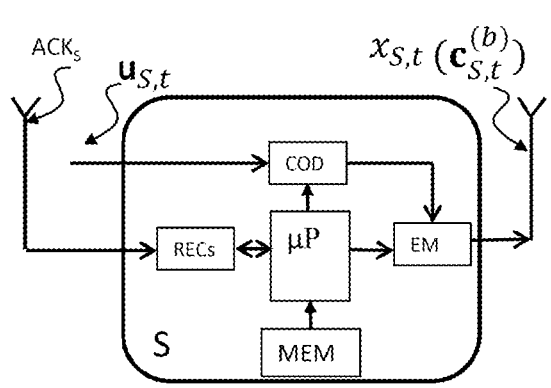
Figure 9:
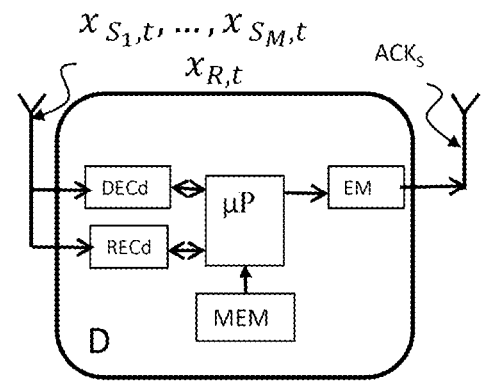
Figure 8:
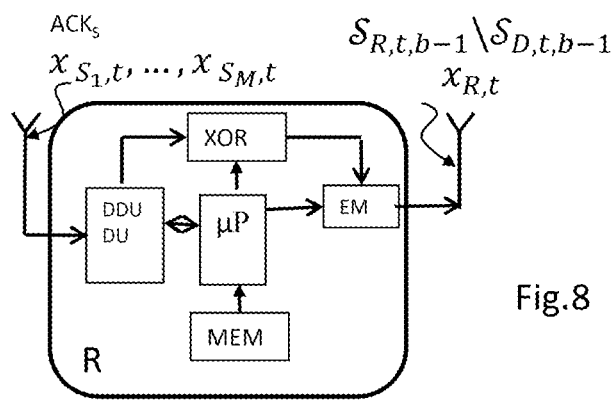

Other characteristics and advantages of the invention will become more clearly apparent on reading the following description of embodiments which are given by way of simple illustrative and nonlimiting examples, and the appended drawings, among which:

FIG. 1 is a diagram illustrating the basic topology of a MARC system with two sources $S_1$, $S_2$, a relay R and a destination D, FIG. 2 is a diagram illustrating the basic topology of a MAMRC system with M sources $S_1, \ldots, S_M$, L relays $\{R_1, R_2, \ldots, R_L\}$ and a destination D, FIG. 3 is a diagram of an embodiment of the steps of the relaying method which are implemented by a source S according to the invention, FIG. 4 is a diagram of an embodiment of a relay according to the invention, FIG. 5 is a diagram of the time-multiplexing between on the one hand the transmissions of the sources and of the relays and on the other hand the feedback, FIG. 6 is a flowchart of the method according to the invention implemented by the relay R, FIG. 7 is a diagram of an exemplary embodiment of a source S according to the invention, FIG. 8 is a diagram of an exemplary embodiment of a relay R according to the invention, FIG. 9 is a diagram of an exemplary embodiment of a recipient device D according to the invention.#

DESCRIPTION OF PARTICULAR EMBODIMENTS

The context of the invention is that in which several sources (senders) $S_1, \ldots, S_M$ wish to dispatch their respective messages to a common destination D with the aid of at least one full-duplex relay $\{R_1, R_2, \ldots, R_L\}$ as illustrated by FIG. 2. When there are several relays, each can utilize the signal sent by the other relays.

There is no constraint on the transmission channel; it can be a fast- or slow-fading channel, it can be frequency selective, and it can be MIMO. In the subsequent description, the nodes (sources, relays and destination) are assumed perfectly synchronized and the sources are independent (there is no correlation between them).

A transmission cycle is decomposed into T transmission intervals (time slots). The duration of a cycle depends on the parametrization of the system and in particular of the MAC layer according to the split into seven layers of the ISO. At each transmission interval, each source has a message of K bits to be transmitted. An item of information of CRC type forms part of the message of K bits transmitted by a source and is used to determine whether a message received is correctly decoded. The T messages of a source may be mutually independent or may be correlated and form a frame.

The sources send simultaneously. The relay attempts to transmit to the destination a useful signal representative of the messages estimated and decoded without error to aid the communications between the sources and the destination. The relay cooperates with the sources by optionally utilizing the signals transmitted by the other active relays of the system simultaneously with the relay.

$\mathbb{F}_2$ is the Galois field with two elements, $\mathbb{R}$ is the field of reals and $\mathbb{C}$ is the field of complex numbers.

FIG. 3 is a diagram of an embodiment of the steps of the relaying method according to the invention which are implemented by the source.

At each transmission interval t, t=1, ..., T, each source S from among the M sources $\{S_1, S_2, \ldots, S_M\}$ has a message $u_{S,t}$ comprising K information bits to be transmitted, $u_{S,t} \in \mathbb{F}_2^K$. The message $u_{S,t}$ comprises a code of CRC type which makes it possible to verify the integrity of the message $u_{S,t}$.

The statistically independent sources $\{S_1, S_2, \ldots, S_M\}$ perform a coding of the message $u_{S,t}$ by means of a code with incremental redundancy and transform the message $u_{S,t}$ into $n_S$ bits denoted $c_{S,t} \in \mathbb{F}_2^{n_S}$. The code word $c_{S,t}$ obtained is segmented into B redundancy blocks, each transmitted during a sub-interval, denoted $c_{S,t}^{(b)} \in \mathbb{F}_2^{n_{S,b}}$ with b=1, 2, ..., B. Each block comprises $n_{S,b}$ bits, $n_S = \Sigma_{b=1}^B n_{S,b}$. The code with incremental redundancy can be of systematic type, the information bits are then included in the first block: $u_{S,t} \in c_{S,t}^{(1)}$. Whether the code with incremental redundancy is or is not of systematic type, it is such that the first block $c_{S,t}^{(1)}$ from among the B blocks can be decoded independently of the other blocks. The highest coding rate at the source S is $K/n_{S,1}$ and it cannot be larger than one, $n_{S,1} > K$. The minimum coding rate for a source S is $K/n_S$. Each block $\{c_{S,t}^{(b)}: 1 < b \leq B\}$ after the first block comprises parity bits which add redundancy to the first block, each of the blocks $\{c_{S,t}^{(b)}: 1 < b \leq B\}$ can be decoded jointly with the first block.

The code with incremental redundancy can be produced for example by means of a finite family of punctured linear codes with compatible rates or of rateless codes modified to operate with finite lengths: raptor code (RC), rate compatible punctured turbo code (RCPTC), rate compatible punctured convolutional code (RCPCC), rate compatible LDPC (rate compatible low density check code, RCLDPC).

Each block $c_{S,t}^{(b)}$ is interleaved by a distinct interleaver denoted $\pi_S^{(b)}$, the code word after interleaving is denoted $b_{S,t} = [b_{S,t}^{(1)}, b_{S,t}^{(2)}, \ldots, b_{S,t}^{(B)}]$. The interleavers make it possible to combat the fadings which can occur during transmission through the channel and make it possible to give each source an imprint which facilitates the separation of the sources by the relay and by the destination. Each interleaved part $b_{S,t}^{(b)}$ of the code word is modulated to obtain a complex code word $x_{S,t} = [x_{S,t}^{(1)}, x_{S,t}^{(2)}, \ldots, x_{S,t}^{(B)}]$ with $x_{S,t}^{(b)} \in \chi^{N_b}$, b=1, 2, ..., B where $\chi \subset \mathbb{C}$ designates a complex signal of cardinality $|\chi| = 2^{q_s}$ and where $N_b = n_{S,b}/q_S$.

Each source S from among the M sources $\{S_1, S_2, \ldots, S_M\}$ can use a minimum coding rate $K/n_S$ and a modulation order $q_s$ which are different from those of the other sources insofar as the numbers of sub-intervals of transmission of the complex code words sent are identical amongst the sources: $n_{S,b}/q_S = N_b$, b=1, 2, ..., B.

Each source S sends the code word $x_{S,t} = [x_{S,t}^{(1)}, x_{S,t}^{(2)}, \ldots, x_{S,t}^{(B)}]$ composed of B blocks during a transmission interval which decomposes into B sub-intervals. Regardless of b, $1 \leq b \leq B$, the concatenation (or accumulation) of the blocks 1 to b is itself a code word since it arises from the incremental redundancy coder.

To simplify the reception structure of the relays and of the destination, the sources described have interleavers, a coder and a modulator which do not vary as a function of the transmission interval t, t=1, ..., T but which may equally well be variable.

The invention proposes a new approach to the cooperation of a relay of a MARC or MAMRC system to aid the sources which transmit and thus to obtain an improvement in the spectral efficiency of the transmission while allowing simple and efficient decoding in the receiver of the recipient.

A relaying method according to the invention is implemented by a full-duplex relay intended for a MARC or MAMRC system. Any relay of a MAMRC system can moreover utilize the signal or the signals transmitted by one or more relays to aid it in its estimation of the messages of the sources.

This relay according to the invention is illustrated by FIG. 4. The relay comprises a detector and a decoder DDU, a decision module DU and a coder and a sender ETU.

The detector and the decoder DDU periodically deliver an estimated version of the decoded messages of the sources to the module DU. Optionally, the joint decoding of the sequence transmitted by one or more other active relays facilitates the decoding of the messages of the sources. In the case of a simultaneous sending on one and the same radio resource, the detection and the decoding by the relay are performed jointly and iteratively.

During each transmission interval $t \in \{1, \ldots, T\}$ and for each sub-interval $b \in \{1, \ldots, B\}$, the relay R receives:

$$y_{R,t}^{(b)} = \sum_{i=1}^{M} h_{S_i,R,t} x_{S_i,t}^{(b)} + \sum_{R_i \in \{R_1,\ldots,R_L\}\backslash R} h_{R_i,R,t} x_{R_i,t}^{(b)} 1_{\{J_{R_i,t}^b \neq \phi\}} + n_{R,t}^{(b)}$$

with $h_{S_i,R,t} \in \mathbb{C}$ the channel gain between the source $S_i$ and the relay R, with $h_{R_i,R,t} \in \mathbb{C}$ the channel gain between the relay $R_i$ and the relay R, $S_i \in \{S_1, \ldots, S_M\}$, $R \in \{R_1, \ldots, R_L\}$, $R_i \in \{R_1, \ldots, R_L\}\backslash R$. $n_{R,t}^{(b)}$ is an additional noise vector of variance $\sigma^2$. $J_{R_i,t}^b$ is the set of the sources' messages with which the relay Ri cooperates during the sub-interval b, and $$1_{\{J_{R_i,t}^b \neq \phi\}}$$

is a function which indicates whether the relay $R_i$ does or does not cooperate (sends or is silent) during the block b:

$$1_{\{J_{R_i,t}^b \neq \phi\}} = \begin{cases} 1 & \text{if } J_{R_i,t}^b \neq \phi \\ 0 & \text{otherwise} \end{cases}, \text{with } \phi \text{ the empty set.}$$

The decoding of the sequence of the other relays is configured at each transmission sub-interval b according to a signaling information item originating from these other relays indicating whether each of these relays cooperates on this block b, b=1, . . . B and indicating for which messages of the sources each of these relays cooperates. Thus, the relay R can determine for each block which messages of the sources are represented in the sequence of each of the other relays and consequently steer the decoded sequences in such a way that they are taken into account during the decoding of the messages of the sources represented in the sequence.

The DDU uses the current block b $y_{R,t}^{(b)}$ and all the previously received blocks $y_{R,t}^{(1)}$, $y_{R,t}^{(2)}$, . . . , $y_{R,t}^{(b-1)}$ to obtain an estimation of the messages $\hat{u}_{S_1,t}, \hat{u}_{S_2,t}, \ldots, \hat{u}_{S_M,t}$ of the sources. The structure and the manner of operation of the DDU are similar to those described in patent applications WO 2015197990 and WO 2015197991.

The coder of the ETU performs a network coding of the messages selected by the module DU to generate a signal representative of these messages. This network coder is for example an exclusive OR of the selected messages. The sender of the ETU ensures the transmission of the representative signal to the destination during the relay cooperation phase. The structure and the manner of operation of the ETU are similar to those described in patent applications WO 2015197990 and WO 2015197991.

The decision module DU tests the CRC of the estimated messages provided by the DDU to determine the messages of the sources decoded without error. It decides whether the relay should transmit and which item of information it should transmit at each sub-interval during the T transmission intervals.

The decision module DU furthermore takes as input data the feedback f db originating from the destination. This feedback indicates from among the M messages of the M sources those which have been decoded without error by the destination. At each sub-interval, the destination uploads the indication of the messages $u_{S,t}$ originating from the sources $S=\{S_1, \ldots, S_M\}$ correctly decoded or not.

The time-multiplexing of the feedback with the transmission of the relays and of the sources is illustrated by the diagram of FIG. 5. This multiplexing ensures that the relay has the feedback at its disposal subsequent to the block b received by the destination and by the relay during the current sub-interval, b, before transmitting a signal during the following sub-interval, b+1.

Thus, the decision module DU selects for the transmission over the following sub-interval, b+1, from among the messages correctly decoded by the DDU at the current sub-interval, b, only those which have not yet been decoded by the destination at the current sub-interval, b, that is to say that the feedback does not indicate as correctly decoded.

During each current sub-interval, b, b=1, . . . , B, of the current transmission interval t of the current cycle, the destination attempts to detect the messages of each source and of the relays and then attempts to decode the messages that it has not yet decoded correctly.

The sequence received by the destination D during the sub-interval $b \in \{1, 2, \ldots, B\}$ of the transmission interval $t \in \{1, \ldots, T\}$ is the following:

$$y_{D,t}^{(b)} = \sum_{i=1}^{M} h_{S_i,D,t} x_{S_i,t}^{(b)} + \sum_{i=1}^{L} h_{R_i,D,t} x_{R_i,t}^{(b)} 1_{\{J_{R_i,t}^b \neq \phi\}} + n_{D,t}^{(b)}$$

in which $h_{S_i,D,t} \in \mathbb{C}$ represents the channel gain between the source $S_i$, $S_i \in \{S_1, \ldots, S_M\}$, and the destination D, $h_{R_i,D,t} \in \mathbb{C}$ represents the channel gain between the relay $R_i$, $R_i \in \{R_1, \ldots, R_L\}$, and the destination D, $n_{D,t}^{(b)} \in \mathbb{C}^{N_b}$ is a noise vector and $J_{R_i,t}^b$ is the set of the sources' messages with which the relay Ri cooperates during the sub-interval b with $$1_{\{J_{R_i,t}^b \neq \phi\}}$$

is an indicator to indicate whether the relay $R_i$ is or is not silent:

$$1_{\{J_{R_i,t}^b \neq \phi\}} = \begin{cases} 1 & \text{if } J_{R_i,t}^b \neq \phi \\ 0 & \text{otherwise} \end{cases} \text{ where } \phi \text{ represents the empty set.}$$

The messages that the destination attempts to decode belong to a subset of the set of possible messages $P_{t,b}$ for t=1, . . . , T:

$$P_{t,b} = \bigcup_{s=1}^{M} \{u_{S,1}, \ldots, u_{S,t}\}$$

The initial conditions for $P_{t,b}$ are such that the set of possible messages at the start of the first sub-interval of the interval t, t>1, is equal to the set of possible messages at the last sub-interval of the interval t−1: t>1, b=1⇒$P_{t,initial}$=$P_{t,0}$=$P_{t-1,B}$ and the set of possible messages at the start of the first sub-interval of the interval t=1 is empty: t=1, b=1⇒ $P_{1,initial}$=$P_{1,0}$=∅.

If the destination correctly decodes the message of the source S={$S_1$, . . . , $S_M$} during the sub-interval b of the interval t, it uploads the control signal $ACK_s$ during the time reserved for the feedback f db indicating that the message of the source S is correctly decoded, as illustrated by FIG. 5.

The relay deduces on the basis of the feedback the set of the messages correctly decoded $\mathcal{S}_{D,t,b}$ by the destination at the end of the sub-interval b. This set is contained in the set of possible messages $P_{t,b}$: $\mathcal{S}_{D,t,b}$⊆$P_{t,b}$.

The initial conditions for $\mathcal{S}_{D,t,b}$ are such that the set of the messages correctly decoded $\mathcal{S}_{D,t,initial}$ by the destination at the start of the first sub-interval of the current interval, t, t>1, is equal to the set of the messages correctly decoded $\mathcal{S}_{D,t-1,B}$ by the destination at the end of the last sub-interval of the previous interval, t−1: t>1, b=1⇒$\mathcal{S}_{D,t,initial}$=$\mathcal{S}_{D,t,0}$= $\mathcal{S}_{D,t-1,B}$ and the set of the messages correctly decoded $\mathcal{S}_{D,1,initial}$ by the destination at the end of the first sub-interval of the first interval, t=1, is empty: t=1, b=1⇒ $\mathcal{S}_{D,1,initial}$=$\mathcal{S}_{D,1,0}$=∅.

The initial conditions for $\mathcal{S}_{R,t,b}$ are such that the set of the messages correctly decoded $\mathcal{S}_{R,1,initial}$=$\mathcal{S}_{R,1,0}$ by the relay at the first sub-interval of the first interval, t=1, is empty: t=1, b=1⇒$\mathcal{S}_{R,1,initial}$=$\mathcal{S}_{R,1,0}$=∅. The relay is therefore silent during the first sub-interval of the first transmission interval.

If the relay receives the signal $ACK_s$, two cases can arise. Either the relay has already correctly decoded the message $u_{S,t}$ of the source S, or the relay has not yet decoded it correctly.

If the relay has already decoded this message $u_{S,t}$ correctly, the latter therefore forms part of the messages decoded without error available on output from the decoder of the DDU. The decision module DU then discards this message $u_{S,t}$ from its selection. The message $u_{S,t}$ is not transmitted to the coder of the ETU.

If the relay has not already decoded this message $u_{S,t}$ correctly, the latter therefore does not form part of the messages decoded without error available on output from the decoder of the DDU. It consequently cannot be selected by the module DU. Furthermore, according to one embodiment, the relay no longer attempts to estimate this message $u_{S,t}$.

Thus, at the current sub-interval, b, 1≤b≤B of the current interval, t, 1≤t≤T, the relay collaborates with the messages of the set of the messages correctly decoded $\mathcal{S}_{R,t,b-1}$ by the relay at the end of the previous sub-interval, b−1, of the current interval, t minus the messages of the set of the messages correctly decoded $\mathcal{S}_{D,t,b-1}$ by the destination at the end of the previous sub-interval, b−1, of the current interval, t: $\mathcal{S}_{R,t,b-1}$\$\mathcal{S}_{D,t,b-1}$. And if the remainder set is empty, $\mathcal{S}_{R,t,b-1}$\$\mathcal{S}_{D,t,b-1}$=∅, then the relay remains silent since it has not decoded any message which is not yet decoded correctly by the destination.

The advantage of cooperating with the remainder set, $\mathcal{S}_{R,t,b-1}$\$\mathcal{S}_{D,t,b-1}$, instead of cooperating with the set of the messages correctly decoded by the relay, $\mathcal{S}_{R,t,b-1}$, is in particular to aid the other relays to decode only the messages of the set of the messages remaining to be decoded by the destination, $P_{t,b}$\$\mathcal{S}_{D,t,b}$, since $\mathcal{S}_{D,t,b-1}$⊆$\mathcal{S}_{D,t,b}$ (the relays listening to one another, they are only concerned with acquiring information on the messages remaining to be decoded i.e. $P_{t,b}$\$\mathcal{S}_{D,t,b}$).

After each sending of a block $c_{S,t}^{(b)}$, a source S does not transmit during a time period required for receiving and decoding the feedback originating from the destination indicating correct or incorrect decoding of the message of this source.

As soon as the source S receives the signal $ACK_s$, it can according to one embodiment stop transmitting the message $u_{S,t}$. Stated otherwise, the source halts the transmission of the blocks following the block $c_{S,t}^{(b)}$ on the basis of which the destination has correctly decoded the message $u_{S,t}$.

Furthermore, if the messages {$u_{S_1,t}$, . . . , $u_{S_M,t}$} of the various sources have all been correctly decoded by the destination then the source passes, according to one embodiment, to the transmission interval following the current transmission interval t of the current cycle or to a cycle following the current transmission cycle if the current interval t is equal to T.

Even if the messages {$u_{S_1,t}$, . . . , $u_{S_M,t}$} of the various sources have not all been correctly decoded by the destination, the source passes, according to one embodiment, to the transmission interval following the current transmission interval t of the current transmission cycle if the current sub-interval b is equal to B.

A flowchart of an implementation by the relay R of the relaying method is illustrated by FIG. 6.

The method 1 comprises a step 2 of detection and of decoding, a step 3 of detecting errors and of decision and a step 4 of coding and of transmission to the recipient of a signal representative solely of messages decoded without error.

The detection and decoding step 2 is implemented by the detector and the decoder of the DDU. This detection and decoding step provides an estimation of the messages on the basis of the words received up to the current sub-interval, b−1, corresponding to the words sent [$x_{S,t}^{(1)}$, $x_{S,t}^{(2)}$, . . . , $x_{S,t}^{(b-1)}$] by each source S from among the M sources {$S_1$, $S_2$, . . . , $S_M$} as well as optionally an estimation of the decoded sequences corresponding to the signals transmitted by the other relays. The detection and decoding step 2 generates an estimated version $\hat{u}_{S_1,t}$, $\hat{u}_{S_2,t}$, . . . , $\hat{u}_{S_M,t}$ of the decoded messages of the sources.

Step 3 of detecting the messages decoded without errors and of decision by the relay R is implemented by the module DU. At each current sub-interval of a current transmission interval t=1, . . . , T, step 3 detects the errors in the estimated messages $\hat{u}_{S_1,t}$, $\hat{u}_{S_2,t}$, . . . , $\hat{u}_{S_M,t}$. According to one embodiment, the detection of errors is performed by utilizing an item of information of CRC type included in the first of the B blocks originating from the sources. On completion of the error detection, it is decided whether an estimated message is or is not decoded without error. The set of the messages correctly decoded by the relay at the current sub-interval b−1 is denoted $\mathcal{S}_{R,t,b-1}$.

In the absence of any message decoded without error, no message is selected to participate in the network coding; the relay remains silent.

If one or more messages are decoded without error, step 3 utilizes the feedback to select from among these messages decoded without error those which will participate in the coding and transmission step 4. This selection is performed only on the basis of the information of the feedback. The selected messages are only those which have not yet been decoded without error by the destination. The error-detection and decision step 3 supplies in accordance with the selection the network coding after each block received and controls the transmission.

According to one embodiment, if the destination has indicated via the feedback that it had decoded without error all the messages, the module DU instructs the detector of the DDU to stop processing the received signals i.e. the error-detection and decision step prohibits detection and decoding until the end of the current transmission interval. Thus, the error-detection and decision step 3 furthermore controls the detection and decoding step 2.

Step 4 of coding and of transmission to the recipient is implemented by the coder and the sender of the ETU. During this coding and transmission step 4, the relay jointly codes the messages decoded without error by the relay and not yet decoded correctly by the destination at the current sub-interval, b−1, while adding inherent redundancy creating a network code. During this step, the relay transmits during the following sub-interval, b, a signal $x_{R,t}^{(b)}$ representative of solely these messages decoded without error as well as that a signal indicating the selected messages $\mathcal{S}_{R,t,b-1} \backslash \mathcal{S}_{D,t,b-1} = S_{R,t-1} \cap \overline{S}_{D,t-1}$.

FIG. 7 is a diagram of an embodiment of a source S according to the invention for the implementation of a relaying method according to the invention. The relaying method is implemented by the activation of a specific software application subsequent for example to the activation of an icon with shortcut displayed on the screen of the source.

The source S comprises a coder COD, a microprocessor µP, a memory MEM, a receiver RECs and a sender EM. The specific software application is stored in the memory MEM. The execution of this software application by the microprocessor µP implements:
- the coding of messages $u_{S,t}$ of K bits comprising a CRC by the coder COD into code words $c_{s,t}$ of type with finite incremental redundancy so as to deliver at each transmission sub-interval b=1, 2, . . . , B of a current transmission interval t of a current transmission cycle of T transmission intervals, T a natural number, T>1, a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks and such that the following blocks are parity bits which add redundancy to the first block, with K and B natural numbers, B>2, 1≤t≤T,
- the sending by the sender EM of the blocks of a code word $c_{s,t}$ during the current transmission interval t destined for the relays and for the destination,
- the reception by the receiver RECs of a feedback $ACK_s$ originating from the destination indicating correct or incorrect decoding of the messages of the sources,
- the stopping of the sending by the sender of the blocks of the code word $c_{s,t}$ when the feedback indicates correct decoding of the message $u_{S,t}$ of the source S,
- the prohibition of any sending by the sender during a time period required for receiving and decoding the feedback $ACK_s$ after each sending by the sender of a block $c_{S,t}^{(b)}$.

FIG. 8 is a diagram of an embodiment of a relay R according to the invention able to cooperate with M sources $S_1, \ldots, S_M$ and L−1 relays $R_1, \ldots, R_{L-1}$ and a destination D of a MAMRC system for the implementation of a relaying method according to the invention. The relaying method is implemented by the activation of a specific software application subsequent for example to the activation of an icon with shortcut displayed on the screen of the relay.

The relay R comprises a decoder DDU, a decision module DU, a microprocessor µP, an XOR network coder, a memory MEM and a sender EM. The specific software application is stored in the memory MEM. The execution of this software application by the microprocessor µP implements:
- the decoding by the DDU on the basis of successive received blocks originating from the sources so as to estimate a message per source,
- the detection of errors in the estimated messages and the decision of the messages estimated without error by the DU,
- the network coding by the XOR of a selection of the messages decoded without error so as to generate a representative signal $x_R$,
- the transmission by the sender EM to the destination of the representative signal $x_R$ and of a control signal indicating the selected messages $\mathcal{S}_{R,t,b-1} \backslash \mathcal{S}_{D,t,b-1} = S_{R,t-1} \cap \overline{S}_{D,t-1}$.

The execution of the codes of the program implies that the DU selects the messages decoded without error as input of the XOR by taking into account only a feedback $ACK_s$ originating from the destination indicating correct or incorrect decoding of one or more messages of the sources and implies that the DU prohibits the sending by the sender after each reception by the relay of a block ($c_{S,t}^{(b)}$) during a time period required for receiving and decoding the feedback ($ACK_s$).

FIG. 9 is a diagram of a recipient device D according to the invention able to cooperate with M sources $S_1, \ldots, S_M$ and L relays $R_1, \ldots, R_L$ of a MAMRC system for the implementation of a relaying method according to the invention. During this cooperation, the device D implements a method for receiving messages. The method for receiving messages is implemented by the activation of a specific software application subsequent for example to the activation of an icon with shortcut displayed on the screen of the device.

The device D comprises a receiver RECd, a decoder DECd, a microprocessor µP, a memory MEM and a sender EM. The specific software application is stored in the memory MEM. The execution of this software application by the microprocessor µP implements:
- the decoding by the decoder DECd of the messages sent by the sources $S_1, \ldots, S_M$ and of the signals sent by the relays so as to obtain estimated messages and to detect errors in the estimated messages,
- the reception by the receiver RECd of control signals sent by the relays so as to determine for each relay the collection $S_{R,t-1}$ of the messages for which this relay is cooperating,
- the sending by the sender EM of a return message $ACK_s$ indicating the messages estimated and decoded without error by the device D.

The sources are for examples users who seek to transmit messages to a common destination which is for example a base station of a mobile access network. The sources are aided by several relays which can be lightweight base stations and/or for example one of the sources in the case where the latter is on the path between the sources and the base station. A source can play the role of relay for example on a radio resource that it does not use to transmit these inherent messages. The sources may equally well be base stations which address themselves to the same destination.

According to a particular use, the sources correspond to mobile terminals. According to another use, the sources may correspond to different services accessible from one and the same terminal but in this case, the terminal is equipped with at least two antennas which determine two different propagation channels between the terminal and the relays and between the terminal and the destination.

The invention claimed is:

1. A method comprising:
   relaying messages implemented by a telecommunication system comprising M sources ($S_1, \ldots, S_M$), L relays ($R_1, \ldots, R_L$) full-duplex relays and a destination (D), M>1, L≥1, the relaying comprising per relay and for a current transmission cycle of T transmission intervals, T a natural number, T>1:
   decoding so as to estimate a message per source on the basis of successive received blocks sent during a current interval t of transmission by a source $S \in \{S_1, S_2, \ldots, S_M\}$ corresponding to a code word $c_{S,t}$ comprising B blocks $c_{S,t}^{(1)}, c_{S,t}^{(2)}, \ldots c_{S,t}^{(b)}, \ldots, c_{S,t}^{(B)}$ the first of which can be decoded independently of the other blocks, a code word $c_{S,t}$ coding a message $u_{S,t}$ of K bits, the sources sending simultaneously, with K and B natural numbers, B>2, 1≤t≤T,
   error detection on the estimated messages and decision of the source messages $u_{S,t}$ decoded without error, at each estimation of a message subsequent to a block received from a source,
   network coding of a selection of the messages decoded without error,
   transmission to the destination (D) of a signal representative of the network-coded messages and of a control signal indicating the selected messages ($\mathcal{S}_{R,t,b-1} \setminus \mathcal{S}_{D,t,b-1}$),
   wherein:
   after each reception of a block ($c_{S,t}^{(b)}$) from the various sources $S = \{S_1, \ldots, S_M\}$, the relay does not transmit during a time period required for receiving and decoding a feedback originating from the destination indicating correct or incorrect decoding of one or more messages,
   the relay selects the messages to be coded from among the messages decoded without error by the relay by taking only the feedback into account.

2. The method as claimed in claim 1, in which the feedback consists of nominative control signals per source.

3. The method as claimed in claim 1, comprising per source S:
   coding into a code word $c_{s,t}$ of a message $u_{S,t}$ of K bits comprising a CRC, the coding being of type with finite incremental redundancy and delivering a block $c_{S,t}^{(b)}$ at each transmission sub-interval b of the current transmission interval t, 1≤b≤B, such that the B successive blocks $c_{S,t}^{(1)}, c_{S,t}^{(2)}, \ldots c_{S,t}^{(b)}, \ldots, c_{S,t}^{(B)}$ form the code word $c_{s,t}$ such that the first block can be decoded independently of the other blocks and such that the following blocks are parity bits which add redundancy to the first block,
   ending after modulation of the blocks $c_{S,t}^{(b)}$ during the B transmission sub-intervals destined for the relay and for the destination.

4. The method as claimed in claim 1, in which after each sending of a block ($c_{S,t}^{(b)}$), a source S does not transmit during a time period required for receiving and decoding the feedback originating from the destination indicating correct or incorrect decoding of one or more messages of the sources and in which the source halts the sending of the blocks if its message $u_{S,t}$ is indicated correctly decoded.

5. The method as claimed in claim 4, in which the source passes to the transmission interval following the current transmission interval t of the current transmission cycle or passes to a cycle following the current transmission cycle if the current interval t is equal to T or if all the messages have been correctly decoded by the destination.

6. The method as claimed in claim 1, in which access to the transmission channel between the L relays and the destination is according to a non-orthogonal multiple access scheme.

7. A full-duplex relay of a telecommunication system comprising M sources ($S_1, \ldots, S_M$), L relays ($R_1, \ldots, R_L$) and a destination (D), M>1, L≥1, the full-duplex relay comprising:
   a processor; and
   a non-transitory computer-readable medium comprising instructions stored thereon which when executed by the processor configure the full-duplex relay to relay messages in the telecommunication system, the relaying comprising the following acts for a current transmission cycle of T transmission intervals, T a natural number, T>1:
   decoding so as to estimate a message per source on the basis of successive received blocks sent during a current interval t of transmission by a source $S \in \{S_1, S_2, \ldots, S_M\}$ corresponding to a code word $c_{S,t}$ comprising B blocks $c_{S,t}^{(1)}, c_{S,t}^{(2)}, \ldots c_{S,t}^{(b)}, \ldots, c_{S,t}^{(B)}$ the first of which can be decoded independently of the other blocks, a code word $c_{S,t}$ coding a message $u_{S,t}$ of K bits, the sources sending simultaneously, with K and B natural numbers, B>2, 1≤t≤T,
   error detection on the estimated messages and decision of the source messages $u_{S,t}$ decoded without error, at each estimation of a message subsequent to a block received from a source,
   network coding of a selection of the messages decoded without error,
   transmission to the destination (D) of a signal representative of the network-coded messages and of a control signal indicating the selected messages ($\mathcal{S}_{R,t,b-1} \setminus \mathcal{S}_{D,t,b-1}$),
   wherein:
   after each reception of a block ($c_{S,t}^{(b)}$) from the various sources $S = \{S_1, \ldots, S_M\}$, the relay does not transmit during a time period required for receiving and decoding a feedback originating from the destination indicating correct or incorrect decoding of one or more messages,
   the relay selects the messages to be coded from among the messages decoded without error by the relay by taking only the feedback into account.

8. A source of a digital signal for a telecommunication system comprising M sources ($S_1, \ldots, S_M$), L relays ($R_1, \ldots, R_L$) and a destination (D), M>1, L≥1, the source comprising:
   a processor; and
   a non-transitory computer-readable medium comprising instructions stored thereon which when executed by the processor configure the source to perform acts comprising: coding messages $u_{S,t}$ of K bits comprising a CRC into code words $c_{s,t}$, of type with finite incremental redundancy so as to deliver at each transmission sub-interval b=1, 2, . . . , B of a current transmission interval t of a current transmission cycle of T transmission intervals, T a natural number, T>1, a block $c_{S,t}^{(b)}$ such that the B successive blocks $\{c_{S,t}^{(b)}: 1 \leq b \leq B\}$ form the code word $c_{s,t}$, such that the first block can be decoded independently of the other blocks and such that the following blocks are parity bits which add redundancy to the first block, with K and B natural numbers, B>2, $1 \leq t \leq T$, sending the blocks of a code word $c_{s,t}$ during the current transmission interval t destined for the relays and for the destination, receiving a feedback originating from the destination indicating correct or incorrect decoding of the messages of the source such that the source halts the sending of the blocks of the code word $c_{s,t}$ when the feedback indicates correct decoding of the message $u_{S,t}$ of the source, and after each sending by the source of a block ($c_{S,t}^{(b)}$), the source prohibits any sending during a time period required for receiving and decoding the feedback.

\* \* \* \* \*

UNITED STATES PATENT AND TRADEMARK OFFICE
CERTIFICATE OF CORRECTION

| | |
|---|---|
| PATENT NO. | : 10,680,754 B2 |
| APPLICATION NO. | : 16/312573 |
| DATED | : June 9, 2020 |
| INVENTOR(S) | : Abdulaziz Mohamad et al. |

Page 1 of 1

It is certified that error appears in the above-identified patent and that said Letters Patent is hereby corrected as shown below:

In the Claims

In Claim 3, Column 17, Line 64:
Please delete "ending" and insert --sending--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*